United States Patent
Wu et al.

(10) Patent No.: US 7,116,463 B2
(45) Date of Patent: Oct. 3, 2006

(54) HIGH ANGULAR DEFLECTION MICRO-MIRROR SYSTEM

(75) Inventors: Xingtao Wu, Woburn, MA (US); Cardinal Warde, Hopkinton, MA (US)

(73) Assignee: Optron Systems, Inc., Bedford, MA (US)

( * ) Notice: Subject to any disclaimer, the term of this patent is extended or adjusted under 35 U.S.C. 154(b) by 0 days.

(21) Appl. No.: 10/891,908

(22) Filed: Jul. 15, 2004

(65) Prior Publication Data

US 2006/0012851 A1    Jan. 19, 2006

(51) Int. Cl.
    G02B 26/00    (2006.01)
(52) U.S. Cl. ...................................... 359/291
(58) Field of Classification Search ................ 359/290, 359/291, 292, 293, 295, 298, 223, 224, 320
    See application file for complete search history.

(56) References Cited

U.S. PATENT DOCUMENTS

| | | | |
|---|---|---|---|
| 4,073,567 A | 2/1978 | Lakerveld et al. | |
| 4,920,660 A | 5/1990 | Nagasawa et al. | |
| 5,202,785 A | 4/1993 | Nelson | |
| 5,351,412 A | 10/1994 | Furuhata et al. | |
| 5,408,355 A | 4/1995 | Rauch et al. | |
| 5,414,726 A | 5/1995 | Raj et al. | |
| 5,434,464 A | 7/1995 | Bobbio et al. | |
| 5,489,812 A | 2/1996 | Furuhata et al. | |
| 5,506,175 A | 4/1996 | Zhang et al. | |
| 5,642,015 A | 6/1997 | Whitehead et al. | |
| 5,726,073 A | 3/1998 | Zhang et al. | |
| 5,867,302 A * | 2/1999 | Fleming | 359/291 |
| 5,960,133 A | 9/1999 | Tomlinson | |
| 6,074,890 A | 6/2000 | Yao et al. | |
| 6,134,042 A | 10/2000 | Dhuler et al. | |
| 6,168,395 B1 | 1/2001 | Quenzer et al. | |
| 6,178,033 B1 | 1/2001 | Ford et al. | |
| 6,184,608 B1 | 2/2001 | Cabuz et al. | |
| 6,215,222 B1 | 4/2001 | Hoen | |
| 6,236,491 B1 | 5/2001 | Goodwin-Johansson | |
| 6,253,001 B1 | 6/2001 | Hoen | |
| 6,256,134 B1 | 7/2001 | Dhuler et al. | |
| 6,264,333 B1 | 7/2001 | Iizuka | |
| 6,285,504 B1 | 9/2001 | Diemeer | |
| 6,400,738 B1 | 6/2002 | Tucker et al. | |
| 6,466,354 B1 | 10/2002 | Gudeman | |
| 6,512,625 B1 | 1/2003 | Mei et al. | |
| 6,529,311 B1 | 3/2003 | Bifano et al. | |
| 2002/0167730 A1 | 11/2002 | Needham et al. | |
| 2004/0027671 A1 | 2/2004 | Wu et al. | |

* cited by examiner

*Primary Examiner*—Hung Xuan Dang
*Assistant Examiner*—Tuyen Tra
(74) *Attorney, Agent, or Firm*—Iandiorio & Teska

(57) ABSTRACT

A high angular deflection micro-mirror system including a substrate, a spacer structure extending from the substrate, a deformable membrane supported by the spacer structure, one or more supports located off center on the deformable membrane, and one or more mirrors on the support cantilevered therefrom to achieve a high angular deflection of the mirrors as the deformable membranes deform.

25 Claims, 15 Drawing Sheets

HIGH ANGULAR DEFLECTION MICRO-MIRROR SYSTEM

FIELD OF THE INVENTION

This invention relates to variable angle micro-mirrors used to steer (direct), attenuate, or deflect an optical beam.

BACKGROUND OF THE INVENTION

Mirrors (micro-mirrors), used to steer (direct), attenuate, or deflect an optical beam, are incorporated in many different devices including optical cross-connects. In U.S. Pat. No. 6,178,033, incorporated herein by this reference, a thin, deformable membrane with a deformable mirror thereon is supported above a substrate. When the deformable membrane is caused to deflect towards the substrate, the mirror deforms to steer (direct) an optical beam incident thereon.

Manufacturing such a deformable mirror, however, is troublesome and controlling such a deformable mirror and preventing it from curling is also problematic. In fact, the '033 patent discusses the need for a bossed frame used to stiffen the membrane area surrounding the mirror. Moreover, when the membrane and the deformable mirror are deflected closer to the substrate, the deflection angle of the membrane limits the angle of incidence and the angle of reflection of the deformable mirror. Also, once the membrane deforms to the extent that it contacts the substrate, no further adjustment of the deflection angle of the deformable mirror is possible, thus limiting the maximum deflection angle of the deformable mirror.

SUMMARY OF THE INVENTION

It is therefore an object of this invention to provide a new high angular deflection micro-mirror system.

It is a further object of this invention to provide such a system which can incorporate a rigid mirror thus overcoming the problems associated with deformable mirrors.

It is a further object of this invention to provide such a system which eliminates the need for bossed frames associated with the prior art.

It is a further object of this invention to provide such a system which can be adjusted to obtain larger maximum angles of optical deflection.

It is a further object of this invention to provide such a system which is simpler and more economical to manufacture.

It is a further object of this invention to provide an array of large angular deflection micro-mirrors.

This invention results from the realization that a micro-mirror with larger maximum optical deflection angles can be achieved by mounting a rigid mirror in a cantilevered manner on a post located away from the center point on the surface of a deformable membrane, thereby eliminating the numerous problems associated with prior art deformable mirrors including curling, the need for a bossed frame, and the limited maximum angles of incidence and reflection.

The invention features a high angular deflection micro-mirror system including a substrate, a spacer structure extending from the substrate, a deformable membrane having a center point and being supported by the spacer structure, a support having a first and a second end and where the first end is disposed away from the center point on the deformable membrane, and having a mirror disposed on the second end of the support.

In the preferred embodiment, the support is a post upstanding on the deformable membrane, the mirror is a rigid mirror and the substrate includes an electrically conductive layer, the deformable membrane includes an electrode layer and the spacer structure is made of an insulating material. Optionally, the substrate further includes a layer over the electrically conductive layer that is electrically insulating. This layer can act as an anti-stiction layer. Also, the deformable membrane further includes an insulating layer.

In some embodiments, the spacer structure includes a plurality of spaced members upstanding on the substrate. In some embodiments, the mirror includes a support layer and, on top thereof, a reflective surface. The system may further include a voltage source interconnected with the electrically conductive layer of the substrate and the electrode layer of the deformable membrane.

In some embodiments, the support and the deformable membrane are integral in construction. In some embodiments, the mirror and the support are integral in construction. In some embodiments, the support, the deformable membrane, and the mirror are integral in construction. In some embodiments, the mirror extends away from the center point of the deformable membrane.

In other embodiments, the system includes a second mirror and a second support, the second support having a first and a second end, the first end is disposed away from the center point on the deformable membrane, the second mirror disposed on the second end of the support. Optionally, the first mirror is configured to reflect and direct a first optical beam and the second mirror is configured to reflect and direct a second optical beam, the first and the second optical beams directed by the first and second mirror to overlap after reflecting off of the first and second mirrors.

In other embodiments, the system includes an array of high angular deflection micro-mirrors. The array includes a substrate, first plurality of spacer structures extending from the substrate, a second plurality of deformable membranes each having a center point and each supported by at least one associated spacer structure, a third plurality of supports each having a first and second end and each disposed away from the center point of an associated one of the second plurality of deformable membranes; and a fourth plurality of mirrors, each mirror is disposed on an associated one of the third plurality of supports and cantilevered therefrom. Optionally, the array of high angular deflection micro-mirrors is a layer of a very large scale integrated (VLSI) chip of the active matrix addressed type.

In some embodiments, the array of high angular deflection micro-mirrors is configured to direct light within a sequential color display application. In other embodiments, the array of high angular deflection micro-mirrors is configured to direct light within a parallel color display application.

In some embodiments, the system includes a substrate, a spacer structure extending from the substrate, a deformable membrane supported by the spacer structure, a rigid mirror having a first and a second end, the mirror supported on the first end above the deformable membrane and having a second end which rotates upward when the deformable membrane deflects downwards towards the substrate.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
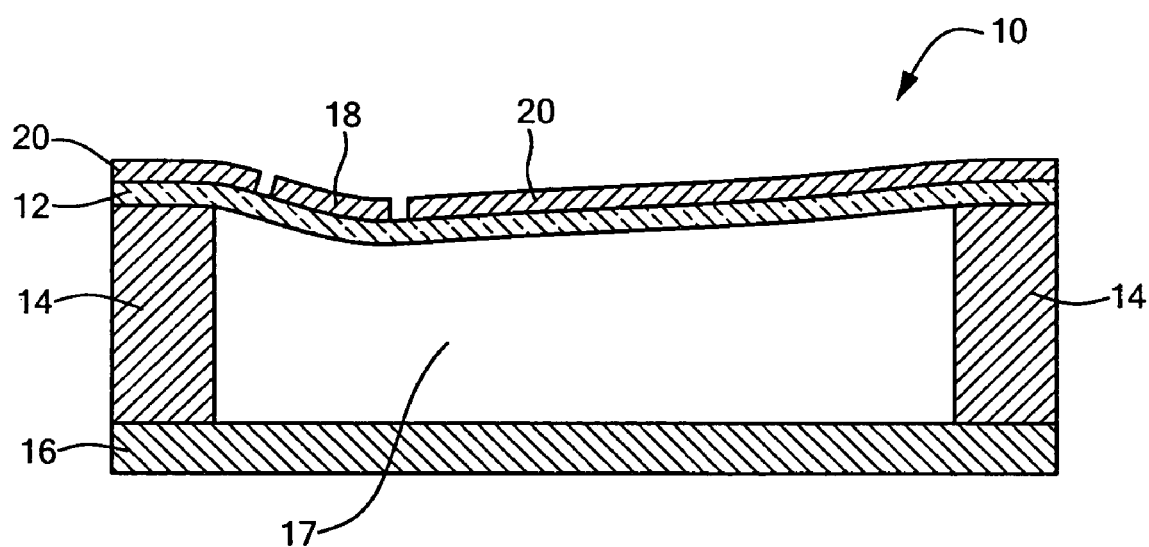
FIG. 1 is a schematic cross sectional view showing a micro-mechanical membrane tilt-mirror optical switch including a deformable mirror in accordance with the prior art.

Referring to FIG. 1, as explained in the previous background section, a prior-art micro-mechanical membrane tilt mirror optical switch 10, includes a membrane 12 with an electrode 20 thereon. The membrane 12 is supported by dielectric spacers 14 above a substrate 16. A coated portion serves as a deformable mirror 18. As the membrane 12 deflects downward, as shown, the deformable mirror 18 deforms downward and thereby causes its associated reflection angle to enlarge.

Unfortunately, the use of the deformable mirror 18 results in several problems. These problems include the difficulty of manufacturing and controlling a deformable mirror in order to prevent it from curling when the membrane 12 deflects. Furthermore, because the deformable mirror 18 is layered into a cavity 17 between the spacers 14, the maximum angles of incidence and reflection of the deformable mirror are limited.

Figure 2:
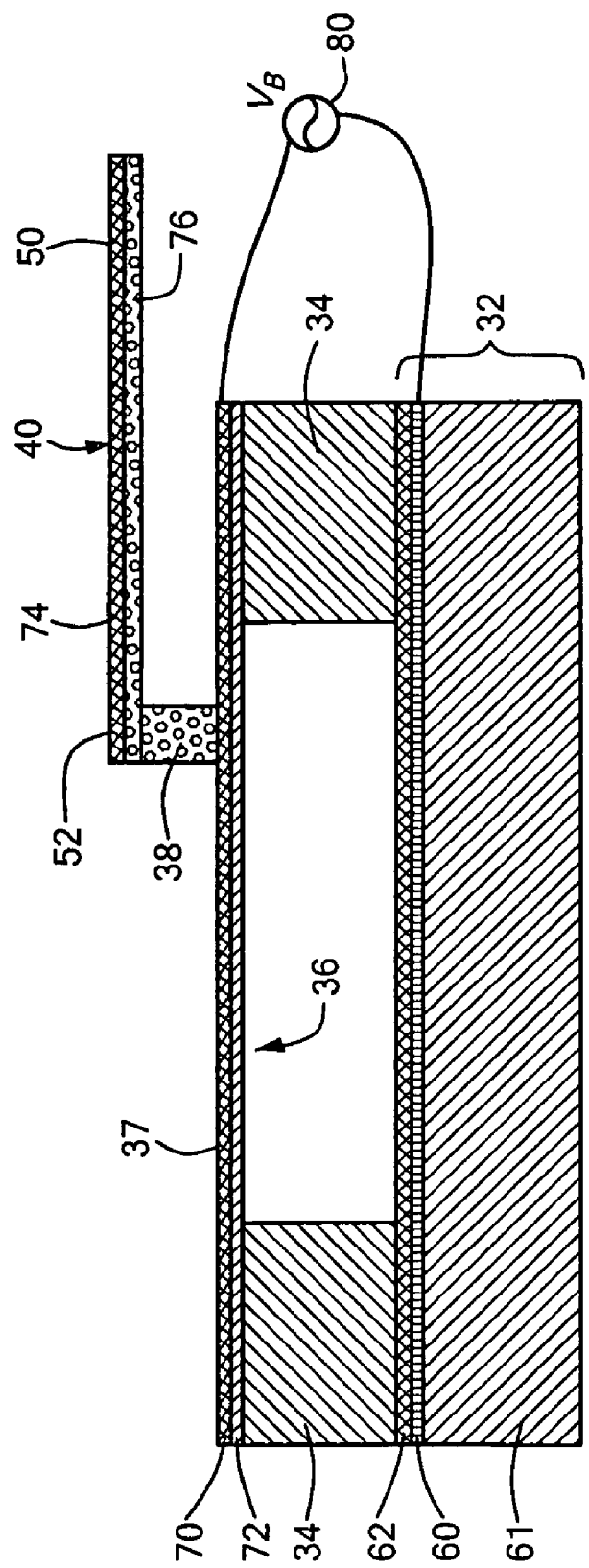
FIG. 2 is a schematic cross sectional view showing the primary components associated with an embodiment of the subject invention including a deformable membrane, a substrate, and a rigid mirror (horizontal as shown) having a reflective surface that is parallel to the upper surface of the substrate.

Referring to FIG. 2, in accordance with an embodiment of the invention, a high angular deflection micro-mirror system 30 includes a substrate 32, a spacer structure 34 extending upwards from the substrate 32, and a deformable membrane 36 supported above the substrate 32 by the spacer structure 34. The system 30 also includes a mirror support 38 (e.g., a post structure 38), located away from the center point 37 (off center) on the upper surface of the deformable membrane 36. The mirror support post 38 supports a rigid mirror 40 in a cantilevered arrangement thereon. The rigid mirror 40 includes a reflective surface 74.

In some embodiments, the support end 52 of the rigid mirror 40 is affixed directly to the mirror support post 38. In other embodiments, the support end 52 of the rigid mirror 40 can be affixed indirectly from the post. In other embodiments, the mirror support post 38 supports the mirror 40 at locations interior from any end (edge) of the mirror 40. Layers 62, 72 and electrodes 60 and 70 are discussed in association with FIG. 3.

Figure 3:
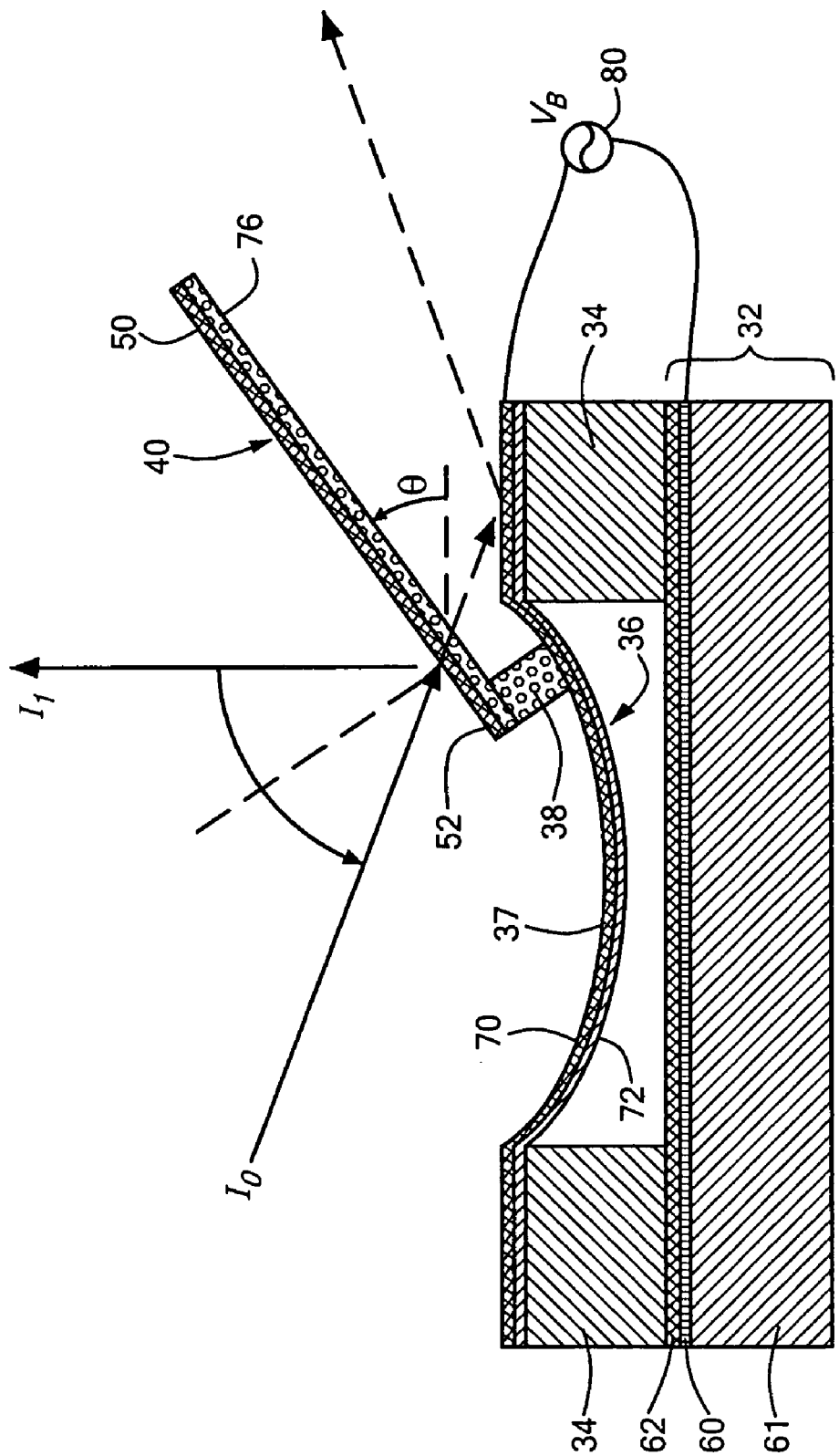
FIG. 3 is a schematic cross sectional view of the embodiment of FIG. 2 showing the deformable membrane in a deflected position.

Referring to FIG. 3, the embodiment of FIG. 2 is shown with the deformable membrane 36 in a deformed state. When the deformable membrane 36 is in a deformed state, the slope (gradient) at the center point 37 of the surface of the deformable membrane 36 is approximately the same (horizontal as shown) as the slope at the center point 37 of the deformable membrane 36 when the deformable membrane 36 is in a non-deformed state.

However, when the deformable membrane 36 is in a deformed state, the slope (gradient) at points away from the center point 37 along the upper surface of the deformable membrane 36 is greater than the slope (gradient) at those same points when the deformable mirror 36 is in a non-deformed state. The slope is larger for points further from the center point 37.

The mirror support post 38 is located away from the center point 37 (off center) on the upper surface of the deformable membrane 36 causing it 38 and the mirror 40 to tilt in response to deformation of the deformable membrane 36. The long dimension of the mirror support post 38 orients perpendicular to the slope (gradient) of the membrane portion at the location where the mirror support post 38 contacts the membrane 36. The rigid mirror 40 cantilevered on top of the post follows the tilting motion of the mirror support post 38, resulting in the angular deflection $\theta$ of the rigid mirror 40. The deformation of the deformable membrane 36 under an increased bias voltage value supplied from voltage source 80, causes an increased deflection angle $\theta$ of the rigid mirror 40.

The cantilevered arrangement of the rigid mirror 40 and the off-center location of the mirror support post 38 achieves several important advantages over the prior art related to deformable mirrors.

Consequently, the maximum deflection angle $\theta$ that is possible for the rigid mirror 40 is much greater than that of the prior art. The end 50 of the rigid mirror 40 that is opposite to the support end 52 of the mirror 40, extends away from the center point 37 of the deformable membrane 36 and extends out over and beyond the most proximate portion of spacer structure 34 and partly over the membrane 36 and possibly over an adjacent membrane (not shown).

This structure causes the end 51 of the mirror 40 to rotate upward when the deformable membrane 36 deflects downward towards the substrate 32. This structure also eliminates the problems associated with deformable mirrors because the rigid mirror 40 does not deform and is not attached directly to the deformable membrane 36. Furthermore this structure is easier to manufacture and easier to control. Also, no bossed frames are required since curling of the mirror 40 is not a concern as with the prior art.

As shown in FIG. 3, the maximum possible angles of incidence of incident optical beam $I_0$, and the maximum possible angles of reflected optical beam $I_1$ are greater than provided by the prior art. The support structure 34 does not interfere with incident optical beam $I_0$ or reflected optical beam $I_1$.

In the preferred embodiment, a substrate 32 includes a conductive electrode layer 60 on a flat rigid plate 61. Preferably, the plate 61 is made of silicon and the electrode layer 60 is made of electrically conductive material (e.g., aluminum) deposited onto the substrate 61. Also in this embodiment, an electrically insulated polymer layer 62 is sputtered onto the electrode layer 60 to prevent electrical shorts and/or to act as an anti-stiction (insulating) layer. If the plate 61 is an electrical conductor, the electrode 60 may not be required.

In the preferred embodiment, spacer structure 34 includes at least two spaced and upstanding insulative (e.g., polymer) members. Preferably the spacer structure 34 has members arranged into a square, rectangular or row configuration. Alternatively, the spacer structure 34 includes continuous curved insulated members in an embodiment having a curved configuration in which curve-shaped spacers are implemented to achieve or comply with desirable mechanical boundary conditions (requirements) such as curved-shaped deformable membrane cells and mirror arrays built on curved-shaped substrates.

In the preferred embodiment, the composite deformable membrane 36 includes a metal (e.g., aluminum) electrode layer 70 deposited on an insulative support layer 72 (e.g., polymer layer) to enable the electrical conductivity across the composite deformable membrane 36. However, the function of the metal electrode layer 70 can be performed by the support layer 72 if it is (itself) electrically conductive.

The rigid mirror 40 can be fabricated to include gold, aluminum, silver or some other reflective surface 74 (see FIGS. 6A–D) and deposited onto the insulative support layer 76 (FIGS. 6A–D). The variable voltage source 80 is electrically connected with the electrode layer 60 of the substrate 32 and the electrode layer 70 of the deformable membrane 36 to create an electromagnetic field (not shown).

The electromagnetic field causes the deformable membrane 36 to deform (deflect) towards the substrate 32 and to thereby increase the deflection angle $\theta$ of the cantilevered mirror 40 (See FIG. 3). As the voltage from the voltage source 80 increases, the strength of the electromagnetic field increases and the deformation of the deformable membrane 36 increases to thereby increase the deflection angle $\theta$ of the mirror 40.

Figure 4:
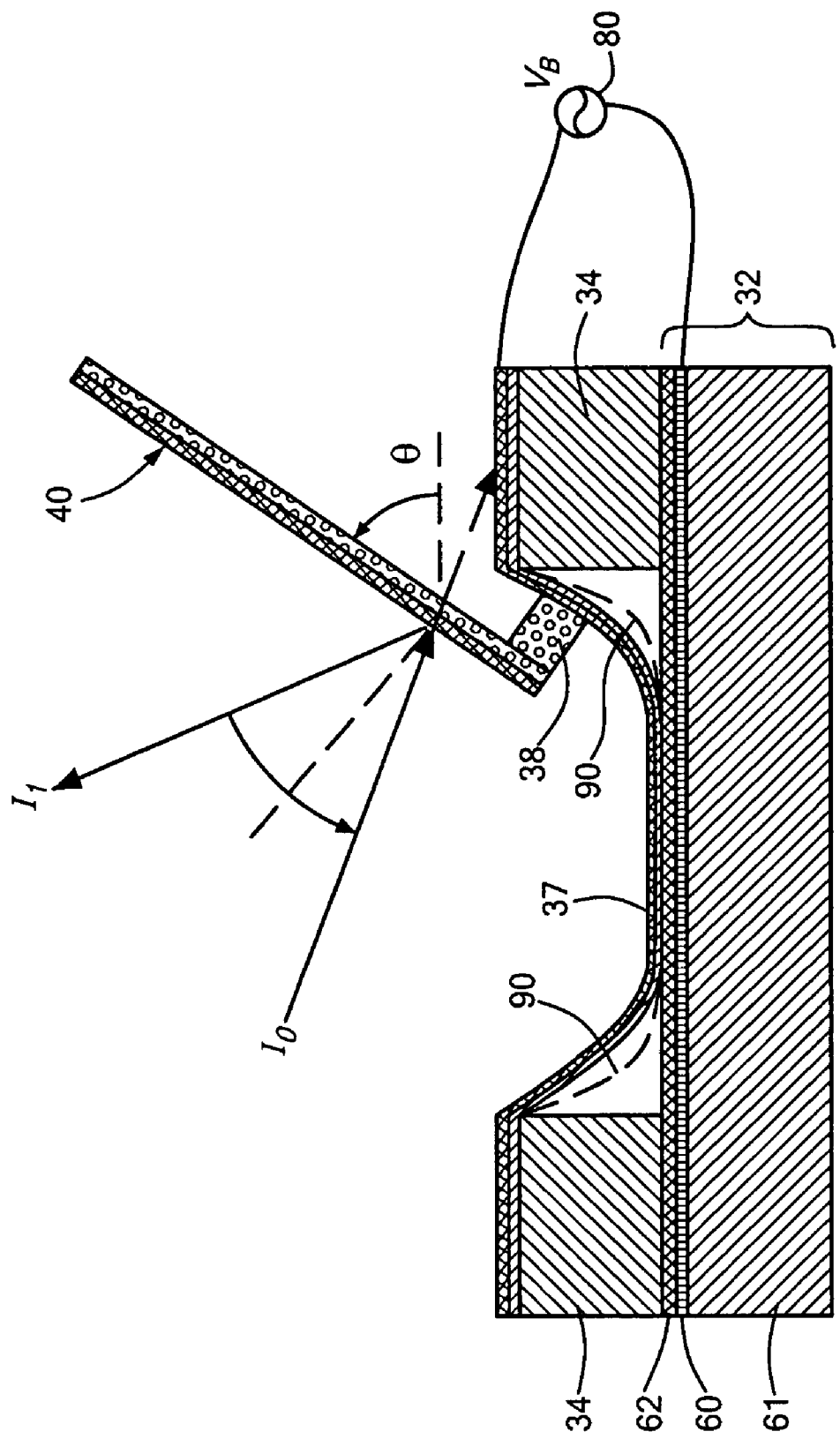
FIG. 4 is a schematic cross sectional view of the embodiment of FIGS. 2 and 3 showing the deformable membrane in a further deflected position with the mirror having an increased angle of deflection.

Referring to FIG. 4, the deformable membrane 36 is deflected to the "snap down" (or "pull-in") position whereupon a central portion of the deformable membrane 36, including its center point 37, engages the substrate 32 via contact with the electrically insulated non-stiction layer 62. But, by further increasing the voltage supplied by the voltage source 80, the deformable membrane 36 is further deflected as shown at position 90. Because the mirror support post 38 is located away from the center point 37 of deformable membrane 36, the deflection angle $\theta$ of the mirror 40 is further increased as a result of increased voltage. Such a large size of the resulting deflection angle $\theta$ is not attained in the prior art.

Figure 5:
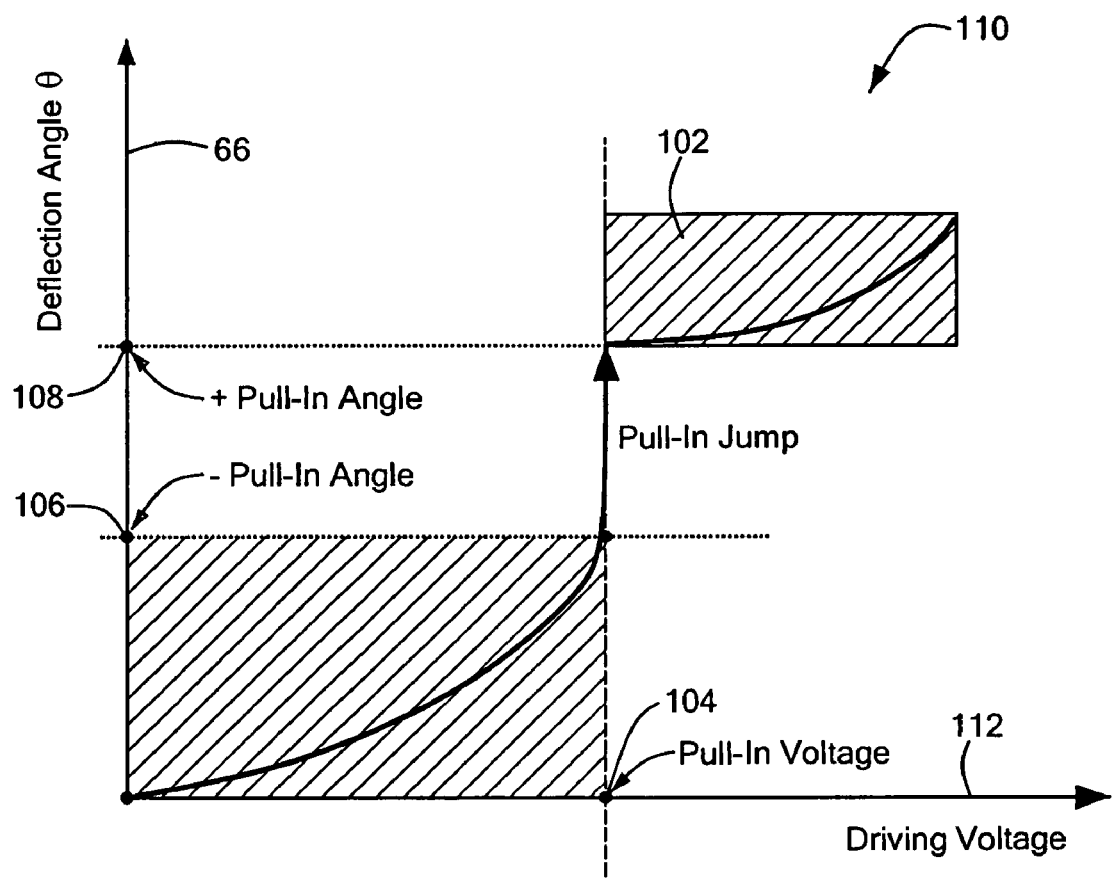
FIG. 5 is a graph showing the relationship between various deflection angles of the mirror of the subject invention and the driving input voltage supplied by a voltage source.

Referring to FIG. 5, the effect of the driving voltage supplied from voltage supply 80 upon the mirror deflection angle $\theta$ is shown. The driving voltage supplied from voltage supply 80 is represented on the horizontal axis 112 of the graph 110. The mirror deflection angle $\theta$ is represented on the vertical axis 66 of the graph 110.

At the deformable membrane pull-in (snap down) voltage 104, the mirror 40 rapidly moves from its pull-in initial deflection angle 106 to its pull-in final deflection angle 108. The pull-in final deflection angle 108 is larger than the pull-in initial deflection angle 106 and also larger than the deflection angles ($\theta$) corresponding to voltages lower than the pull-in voltage 104.

The control signal (not shown) to the variable voltage source 80 that controls the voltage supplied by the voltage source 80, can be varied to obtain the desired deflection angles of the mirror 40 within the first analog tunable operation region 100. After the deformable membrane pull-in occurs, and if more voltage is supplied from the voltage source 80, the deformable membrane 36 will further deform within the second analog tunable operating region 102 and its contact area with the electrically insulated polymer layer 62 will become larger. The mirror deflection angles of the second analog tunable region 102 are larger than those in the first analog tunable operating region 100.

Thus, there are two analog tunable regions of the rotation of the mirror. In some embodiments, a bi-stable mode of operation exists such that each mirror is either in an ON or an OFF state. In these embodiments, for example, only two specific voltage values are chosen to be applied to the device 30, allowing only two mechanical deformation states of the deformable membrane 36. This is referred to as a "bi-stable" mode of operation.

A large deflection angle of near 90° is theoretically obtainable beyond the snap down actuation voltage. Thus, in the subject invention, the range and controllability of the mirror position is improved, and the miniaturization and high speed of operation of the invention are realized.

Preferably, the manufactured sizes of the components of the system 30 shown in FIGS. 2–4 are small and dimensioned in units of microns. For example, the spacing between the deformable membrane 36 in its relaxed state (θ=0) and substrate 32 can be between 0.1 and 1000 microns. The substrate 32, spacers 34, and the deformable membrane 36 can optionally be fabricated using manufacturing techniques and materials known to those skilled in the art and/or as delineated in U.S. Pat. No. 6,178,033, incorporated herein by this reference. In some embodiments, the mirror 40 may also be constructed from a dielectric stack of materials as is known in the art. Typical and well-known micro-electromechanical fabrication techniques can be used to manufacture the system 30.

Referring to FIGS. 6A–6D, FIG. 6A is a partial schematic cross sectional view showing an embodiment of the subject invention wherein the mirror support post 38' is integral with a portion 76' of the mirror 40' and a portion 72' of the deformable membrane 36'. The mirror support post 38' is made from the same material as the portion 76' of the mirror 40' and as the portion 72' of the deformable membrane 36'.

The mirror support post 38' is manufactured to be integral with a polymer membrane support layer 72' of deformable membrane 36' and with polymer mirror support layer 76' of rigid mirror 40'. The rigid mirror 40' is constructed using coating, deposition, and micro-electromechanical etching techniques that are understood by those skilled in the art.

In this embodiment, a high reflectivity mirror coating such as gold, aluminum or silver 74' is deposited on polymer mirror support layer 76' while electrode layer 70' is deposited under polymer membrane support layer 72'.

In other embodiments, like that shown in FIG. 2, electrode layer 70 is deposited on top of membrane support layer 72. There is no requirement that either layer 70 or 72 reside above or below the other layer 72 or 70, respectively.

Figure 6B:
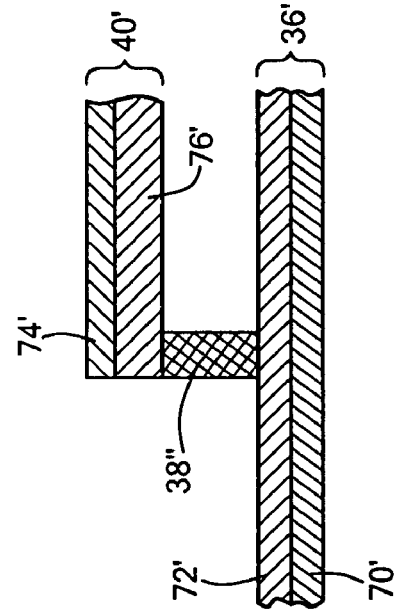
FIG. 6B is a partial schematic cross sectional view showing an embodiment of the subject invention wherein the mirror support post is not integral with the mirror and the deformable membrane.

FIG. 6B is a partial schematic cross sectional view showing an embodiment of the subject invention wherein the mirror support post 38" is not integral with the mirror 40' and the deformable membrane 36'. The mirror support post 38" is made from a different material than that of the mirror 40' and that of the deformable membrane 36'.

Figure 6D:
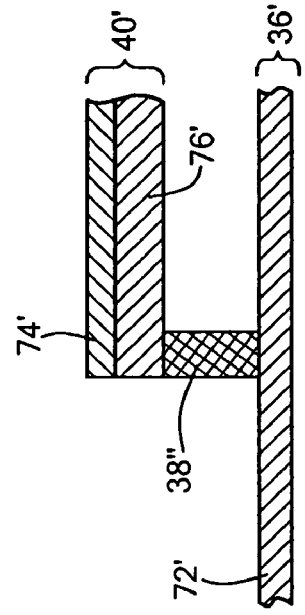
FIG. 6D is a partial schematic cross sectional view showing an embodiment of the subject invention wherein the deformable membrane is composed of a single-film material and wherein the mirror support post is not integral with the mirror and the deformable membrane.
Figure 6A:
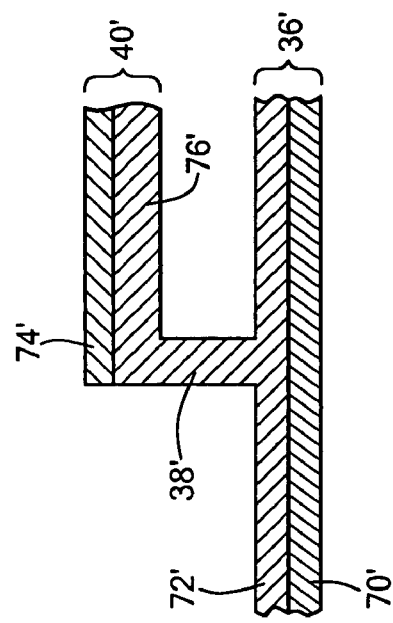
FIG. 6A is a partial schematic cross sectional view showing an embodiment of the subject invention wherein the mirror support post is integral with a portion of the mirror and a portion of the deformable membrane.
Figure 6C:
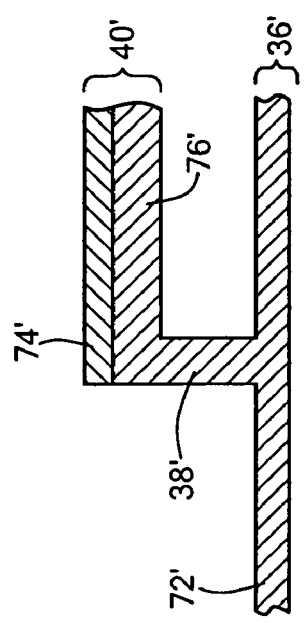
FIG. 6C is a partial schematic cross sectional view showing an embodiment of the subject invention wherein the deformable membrane is composed of a single-film material and wherein the mirror support post is integral with the deformable membrane and a portion of the mirror.

FIG. 6C is a partial schematic cross sectional view showing an embodiment of the subject invention wherein the deformable membrane 36' is composed of a single-film material and wherein the mirror support post 38' is integral with the deformable membrane 36' and a portion 76' of the mirror 40'. The mirror support post 38' is made from the same material as that of the deformable membrane 36' and as that of the portion 76' of the rigid mirror 40'. For some single-film materials, the reflector portion 74' is not necessary.

FIG. 6D is a partial schematic cross sectional view showing an embodiment of the subject invention wherein the deformable membrane 36' is composed of a single-film material and wherein the supporting post 38" is not integral with the mirror 40' and the deformable membrane 36'. The supporting post 38" is made of material that is different from that of the mirror 40' and that of the deformable membrane 36'.

A plurality of the types of structures of FIGS. 2–6D may be combined as elements of an array such that one common substrate 32 supports a plurality of spacer structures 34 supporting a plurality of deformable membranes 36. On each deformable membrane 36 there is disposed one or more upstanding mirror support posts 38 and on each of these upstanding mirror support posts 38 there is disposed a cantilevered mirror 40, that is preferably rigid.

Figure 7:
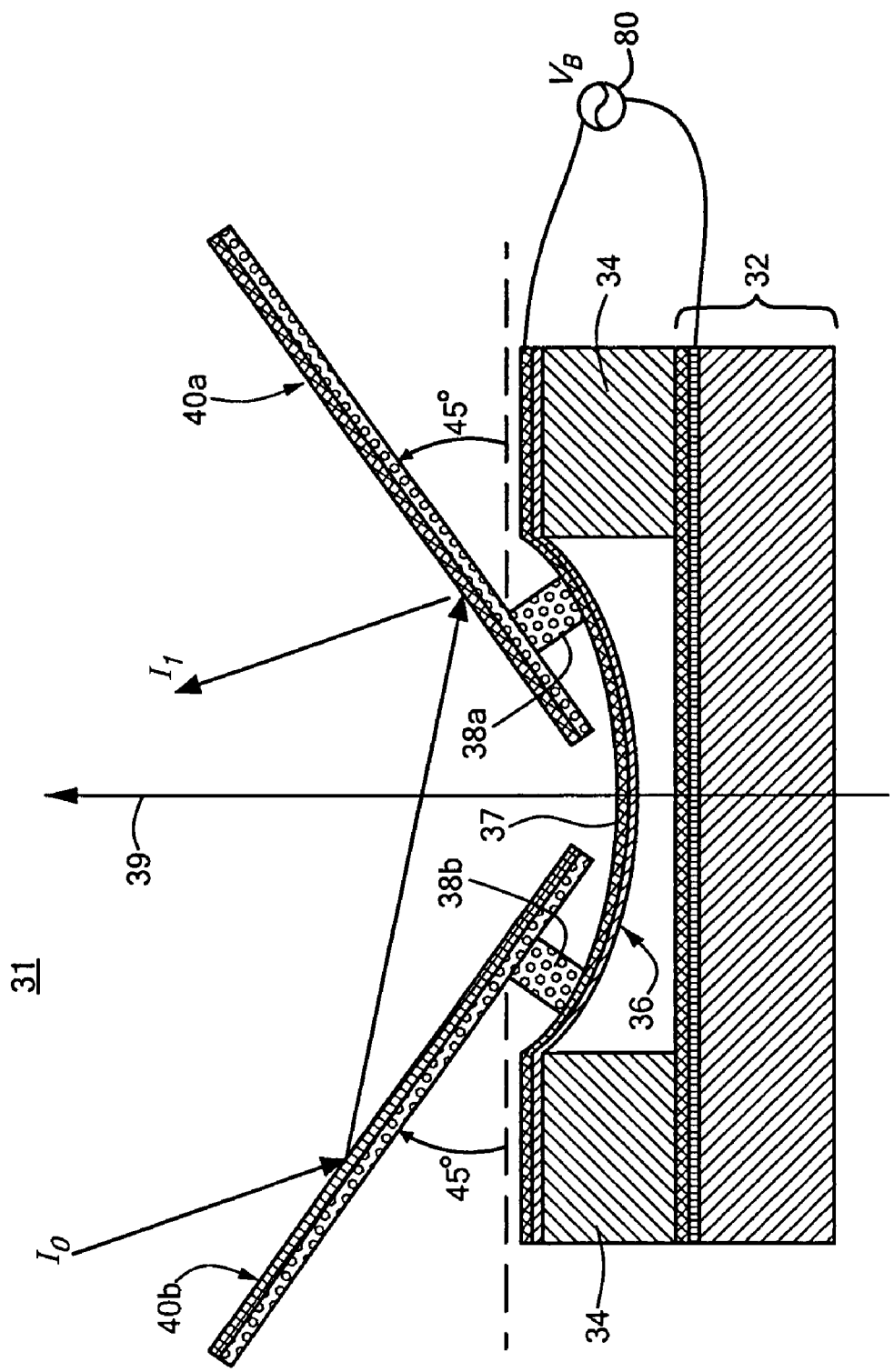
FIG. 7 is a schematic cross sectional view of an alternative embodiment having two mirrors per membrane.

FIG. 7 shows an embodiment of a double mirror deflection system 31 wherein one deformable membrane 36 positions a pair of mirrors 40a and 40b. Mirrors 40a and 40b are preferably rigid mirrors. The mirror support posts 38a and 38b supporting mirrors 40a and 40b may be either symmetrically or randomly located on membrane 36 relative to the location of its center point 37. An optical beam ($I_o$) is shown reflecting off of mirror 40b and reflecting off of mirror 40a ($I_1$).

The lengths of the mirrors 40a and 40b may extend beyond the dimensions of the membrane 36, as shown. The rigid mirrors 40a, 40b may also be positioned so there is a very small gap (approximately 1–2 microns) separating them when the membrane 36 is in an undeformed state. As shown in FIG. 7, the mirrors 40a, 40b are tilted relative to their respective un-tilted mirror positions when the membrane 36 is in an undeformed state.

The spacer structure 34 may also be a square, rectangular, triangular, hexagonal or a circular in cross-section and arranged in a web pattern. In some embodiments, more than two mirrors can be attached to each membrane 36 to form sets of mirrors that all tilt (rotate) in unison towards the central axis 39 of the membrane 36. The central axis 39 intersects the center point 37 of the membrane 36.

Figure 8:
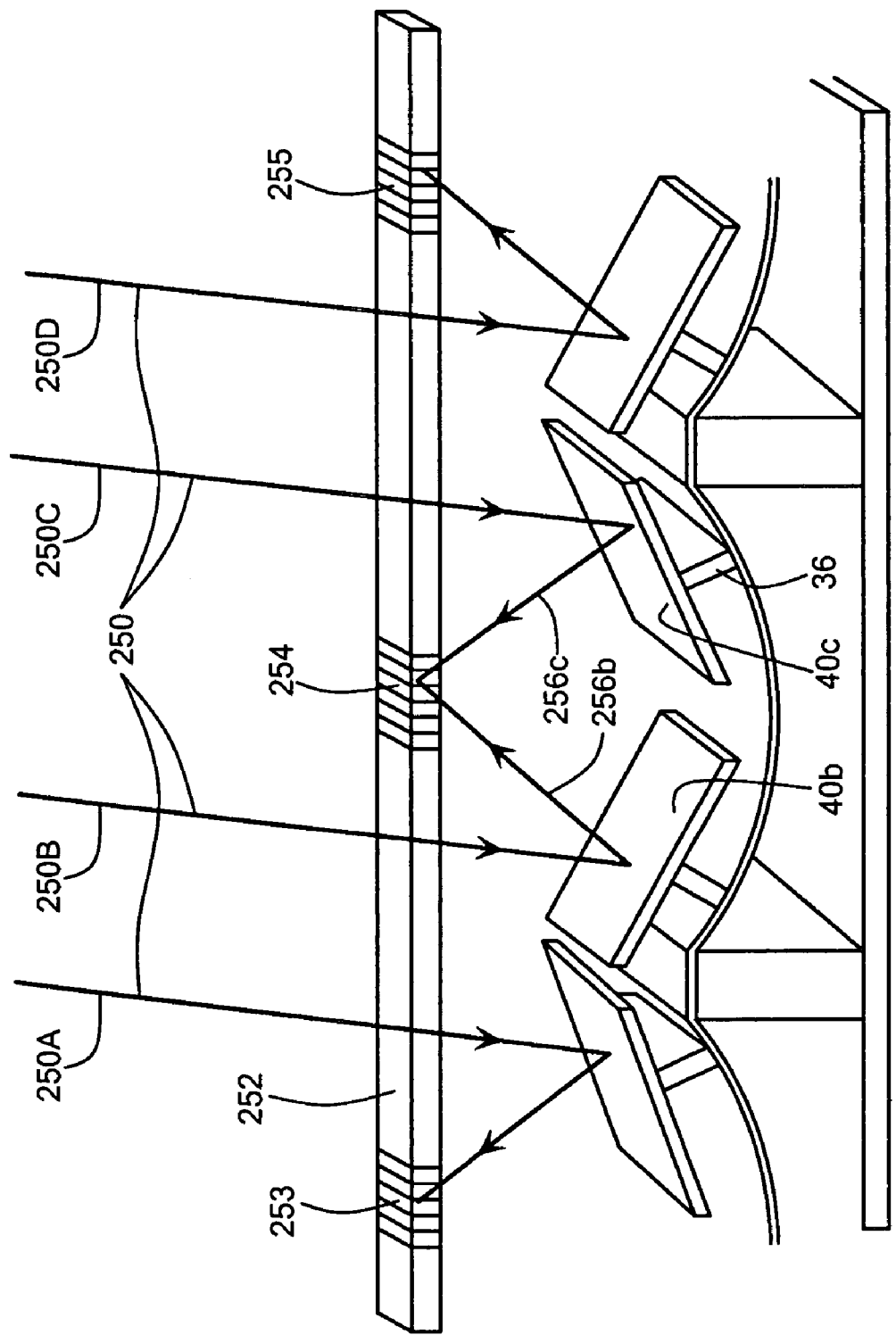
FIG. 8 illustrates the use of the embodiment of FIG. 7 for the writing of microholograms in a suitable holographic recording medium.

This type of embodiment 31, having two or more mirrors, can be duplicated into multiple elements of a linear (one-dimensional) array or of a two-dimensional array. These types of embodiments may be used in applications where it is necessary to overlap two or more optical beams or necessary to overlap an array of optical beams in pairs, triples, quadruples etc. Such applications include the simultaneous writing of holographic arrays into a suitable holographic recording medium as illustrated in FIG. 8. As illustrated in FIG. 8, a linear array of deformable membranes 36 each control the position of a pair of mirrors.

FIG. 8 illustrates the use of the embodiment of FIG. 7 for the writing of micro-holograms in a suitable holographic recording medium. An array of light beams 250 impinge on a one-dimensional array of mirrors having two mirrors 40b and 40c per membrane 36. A pair of optical beams 250b, 250c are shown being reflected in pairs 256B, 256C to write a hologram 254 into a bar of holographic recording material 252. One of the two optical beams 250B carries object (holographic image) information and the other optical beam 250C is a reference beam. The reference beam 250C may be a plane wave.

Different holograms 253, 255 may be written at different locations of the holographic bar 252. The voltage applied to each membrane 36 alters the position of each mirror 40b, 40c on the membrane 36. Holograms can be written at different locations by applying a different voltage to each membrane 36 to position the mirrors 40b, 40c and to position the location where the light reflected from the mirrors will overlap and intersect a holographic bar. Different holograms may be written by placing different information on each of the pair of optical beams.

This type of embodiment of the invention relates to micro and nano device fabrication through the overlap of multiple light beams that are controlled by sets of micro-sized mirror arrays. Other related applications of this system 31 will be apparent to those skilled in the art of micro optics, micro holography, nano structures device fabrication, photonic bandgap materials fabrication and optical interconnection device fabrication.

Figure 9:
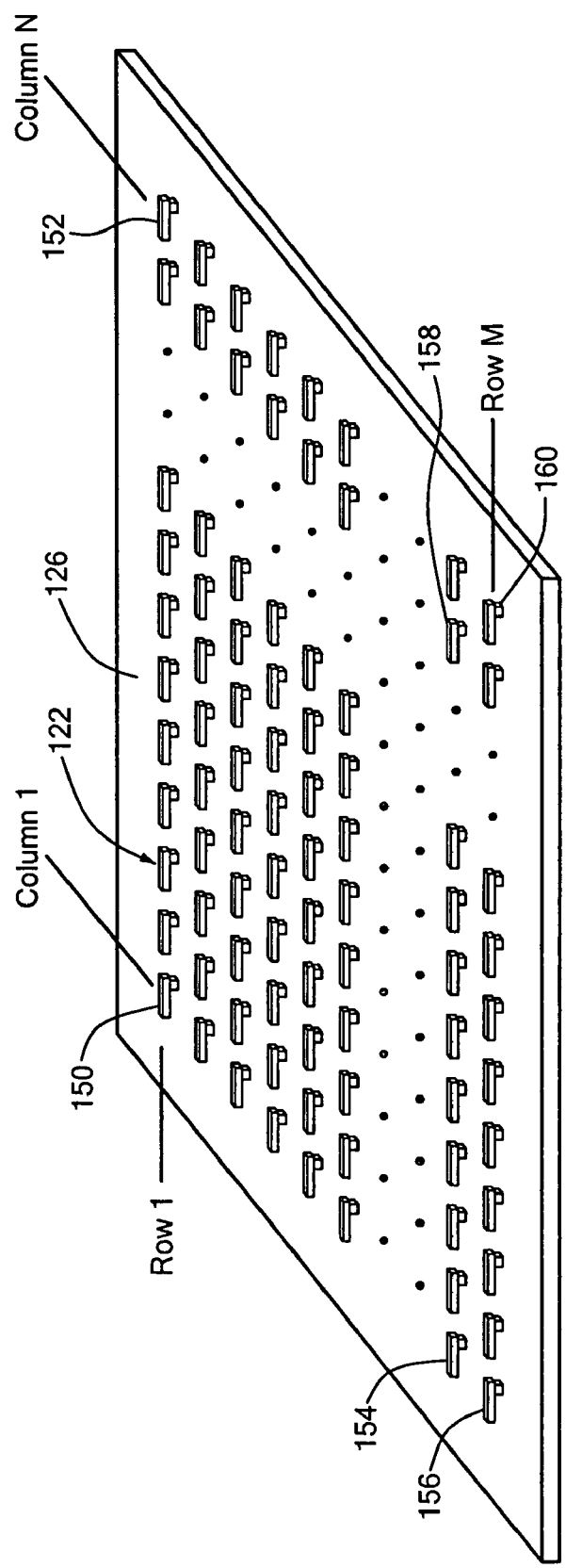
FIG. 9 is a top perspective view of a two-dimensional M×N array of mirrors (micro-mirrors) fabricated on a single plate (common substrate) in accordance with an embodiment of the subject invention.

Referring to FIG. 9, a top perspective view of a two-dimensional M×N array of mirrors 122 (micro-mirrors) fabricated on a single plate (common substrate) 126 is shown in accordance with the subject invention. The array of mirrors (mirror array) 122 has M rows and N columns. Each mirror of the M×N array of mirrors 122 can be identified through its column number and row number. The mirror array 122 is disposed onto a substrate 126.

The substrate 126 is typically a substrate composed of multiple physical layers. These layers function not only to mechanically support the mirror support post 38, mirror 40, deformable membrane 36 and spacer structures 34 but also function to contain a driver control circuit, for example, an embedded very large scale integration (VLSI) driving module as shown in FIG. 11 that controls the voltage source 80 for each membrane.

Figure 12:
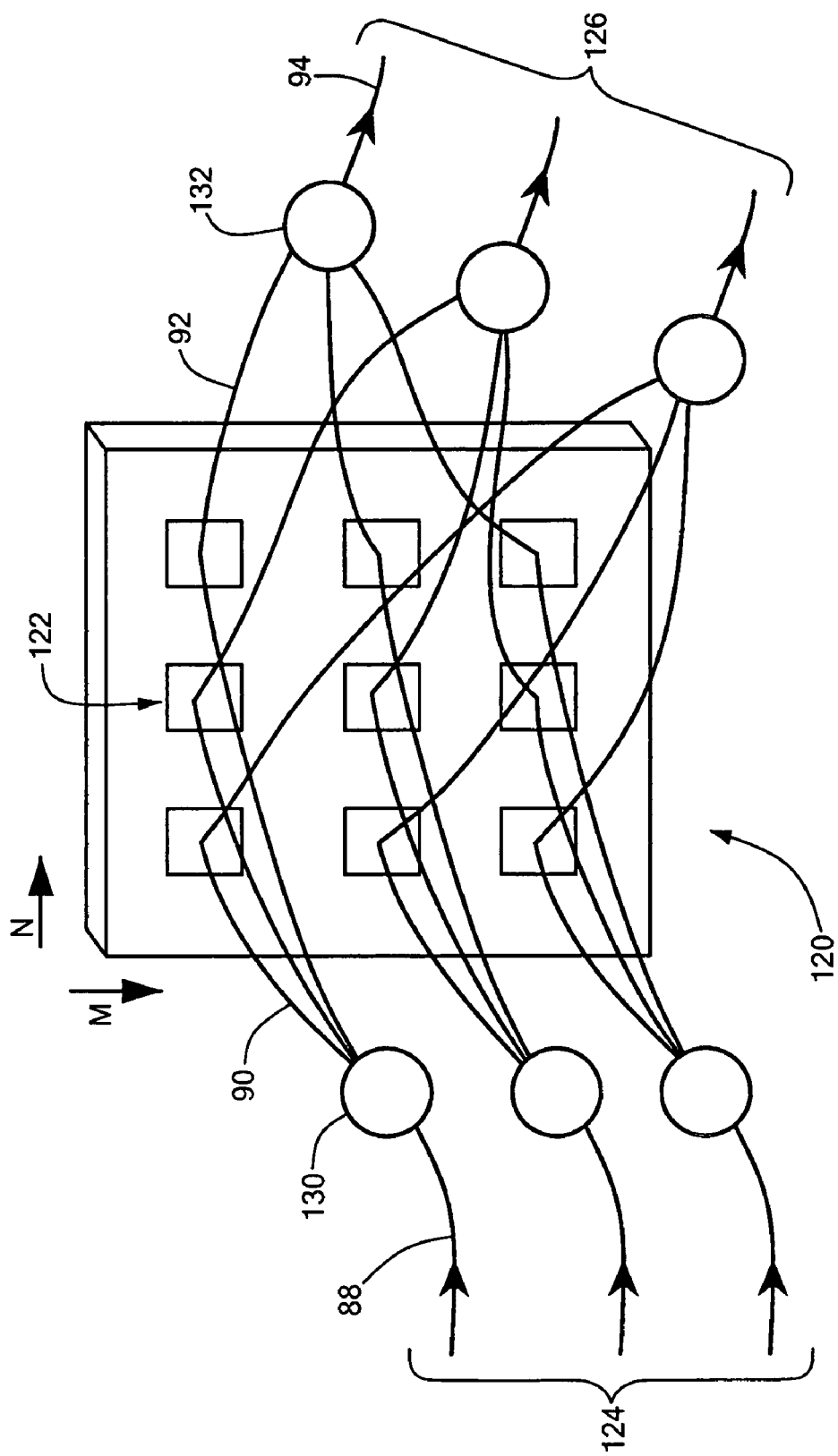
FIG. 12 is a diagram showing the primary components of an optical cross-connect switch in a fiber-optic application incorporating an M×N array of mirrors (micro-mirrors) in accordance with an embodiment of the subject invention.

Mirror coordinates within the mirror array 122 are assigned in a manner consistent with the rules of general matrix algebra. As shown in FIG. 9, mirror 150 is the (1, 1) element, mirror 152 is the (1, N) element, and mirrors 154, 156, 158, and 160 are the (M−1, 1), (M, 1), (M−1, N−1), and (M, N) elements, respectively. As shown in FIG. 12, those skilled in the art can construct a global mapping between M input optical fibers and N output optical fibers using this M×N mirror array of mirror switches 122. Each membrane within the array, controlling at least one mirror, is also referred to as a membrane pixel.

Figure 10:
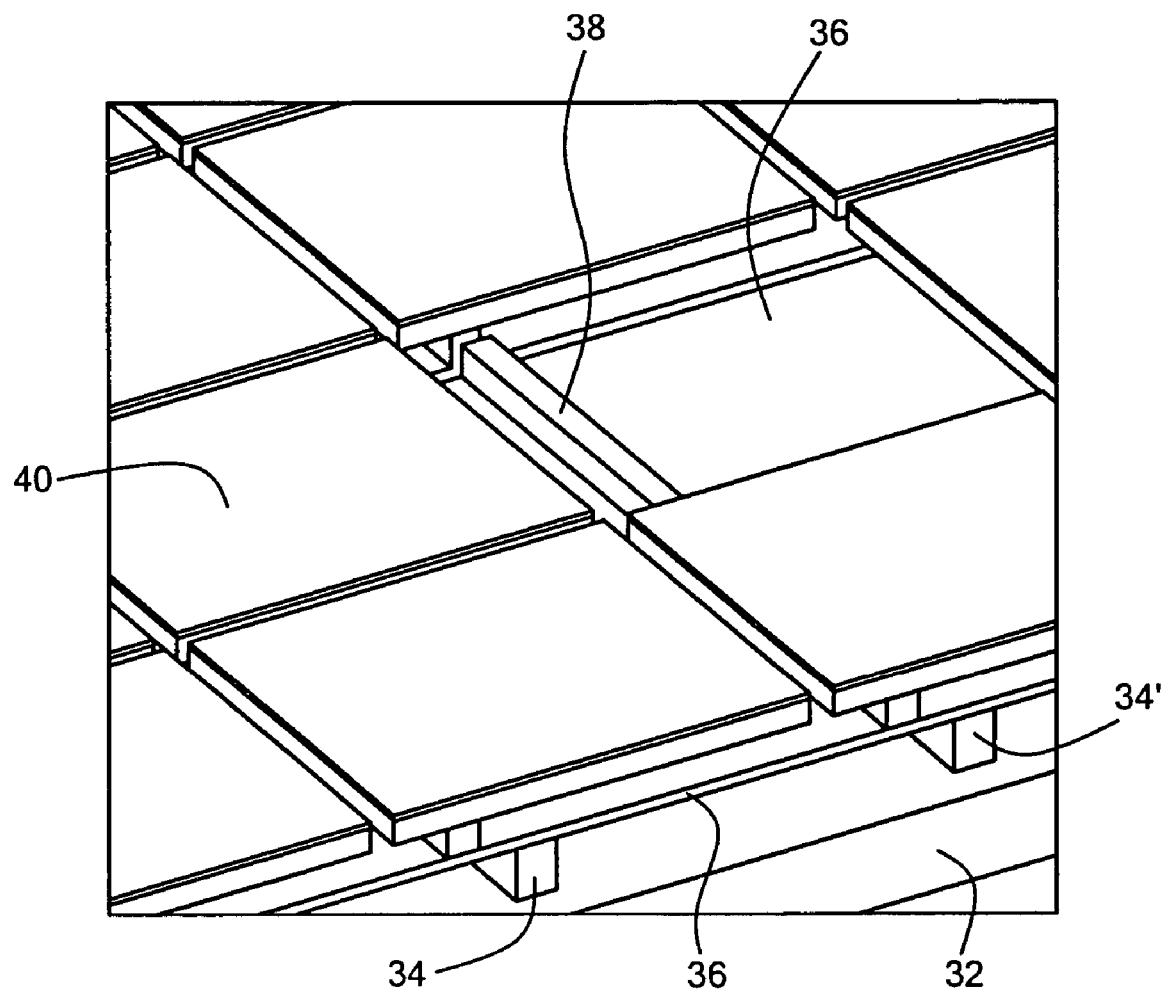
FIG. 10 is a magnified perspective view of an M×N array of mirrors (micro-mirrors) fabricated on a single plate (substrate) in accordance with an embodiment of the subject invention.

FIG. 10 is a magnified perspective view of an M×N array of mirrors (micro-mirrors) fabricated on a single substrate (plate) 32 in accordance with the subject invention. The top surfaces of mirror 40, a mirror support post 38 and a deformable membrane 36 are shown from a top view perspective. Spacers 34, deformable membrane 36 and a substrate 32 are shown from a side view perspective.

Figure 11:
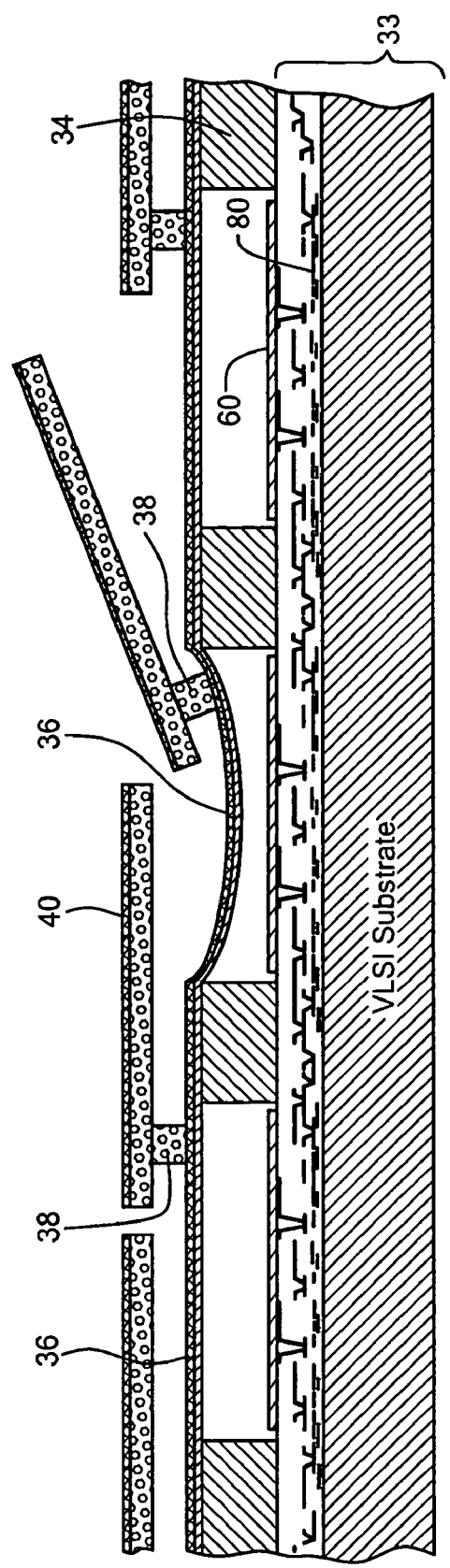
FIG. 11 is a magnified cross sectional view of a portion of the embodiment of an M×N array of mirrors fabricated on a VLSI (very large scale integration) substrate in accordance with an embodiment of the subject invention.

FIG. 11 is a magnified cross sectional view of a portion of the embodiment of an M×N array of mirrors fabricated on top of a very large scale integration (VLSI) substrate 33 in accordance with the subject invention. A mirror 40, a mirror support post 38, a deformable membrane 36, a spacer 34, an electrode layer 60 and a very large scale integration (VSLI) processing layer 80 are shown from a side view perspective. In this embodiment, VSLI transistors apply voltages to deform each membrane of the array. The VLSI substrate can be of the active-matrix-addressed type so that the deformation of each membrane and each mirror is controlled independently.

Referring to FIG. 12, optical cross-connect 120 includes such an M×N array 122 of high angular deflection mirrors having M (3) input optical fiber couplers 130 and N (3) output fiber combiners 132. A 3×3 mirror array is shown for simplicity. The short lengths of optical fibers 88 and 90 are integral to the input optical fiber couplers 130 and optical fibers 92 and 94 are integral to the output fiber combiners 132. The optical fibers 88, 90, 92 and 94 are connectorized using techniques known to those of skill in the art, so that a set of external incoming and outgoing optical fibers (not shown) can be connected to the optical fibers 88, 90, 92, 94 and the cross-connect switch 120.

Each of the M (3) input fibers in the array 124 can each direct light to only those mirrors in a single row as shown in FIG. 12. There are M (3) rows of mirrors. Similarly, each of the N (3) output fibers 126 captures the light reflected from all the mirrors in a single column as shown in FIG. 12. There are N (3) columns of mirrors. Each of the M×N mirrors in the array is configured to switch light or not to switch light from an input fiber array 124 to an output fiber array 126. Thus any input fiber in 124 can be connected to (in communication with) any output fiber in 126 via operation of the N×M array of mirror switches 122.

In other embodiments, the M×N matrix of mirrors need not be on a single substrate. A total of M multiplied by N single and discrete (separate) mirrors will perform the same tasks as long as they are topologically connected in the same way and addressed in the same way as the rectangular array of mirrors shown in FIG. 12. Relaxing the constraint of having a planar two-dimensional array of switches can have packaging advantages in some applications.

Figure 13:
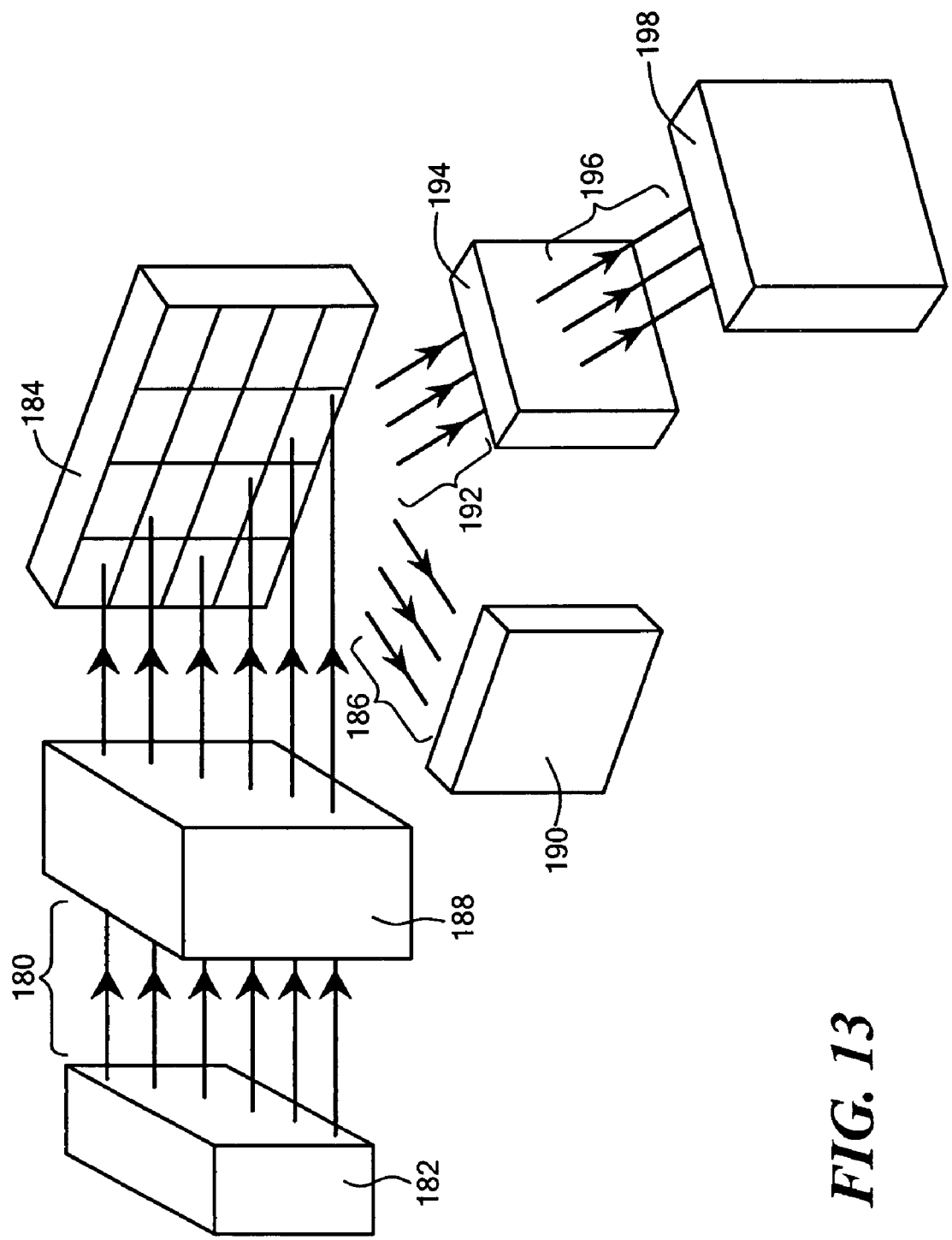
FIG. 13 is a schematic block diagram illustrating an array of mirrors (micro-mirrors) implemented within a print engine system in accordance with an embodiment of the subject invention.

FIG. 13 is a schematic block diagram illustrating an array of mirrors (micro-mirrors) implemented within a print engine system in accordance with an embodiment of the subject invention. An M×N array of optical (light) beams 180 are directed by an optical processing system 188 from a M×N array of light sources such as light-emitting diodes, diode lasers, or one or more light sources 182 that have been suitably conditioned. The M×N array of optical (light) beams 180 are addressed to an array of M×N mirrors 184 as incident light.

The array of mirrors 184 actuates its mirrors (not shown) to an "on" or an "off" state, each state directing and reflecting optical beams (light) in a different angular direction. Optical (light) beams 186 reflecting from the "off" state mirrors are directed to an optical absorber 190 and optical (light) beams 192 reflecting from the "on" state mirrors are directed into the next processing stage 194.

Processing stages 188 and 194 include any necessary optical configurations (e.g., imaging and focusing optics) typically used within a printing system. The optical (light) beams 196 output from stage 194 are directed and imaged to an image plate 198 forming a pattern on the imaging plate 198. The image plate 198 can be any photo-sensitive thin film or any other mask plate typically used for printing purposes. The light in this system may be ultraviolet, visible or infrared.

FIG. 13 is also applicable to an embodiment where 182 produces a single large-area optical (light) beam 180 rather than an array of optical (light) beams. In this embodiment, optical (light) beam 186 is also a single large-area beam and the mirror array 184 generates a set of individual optical (light) beams out of the single optical (light) beam.

Figure 14A:
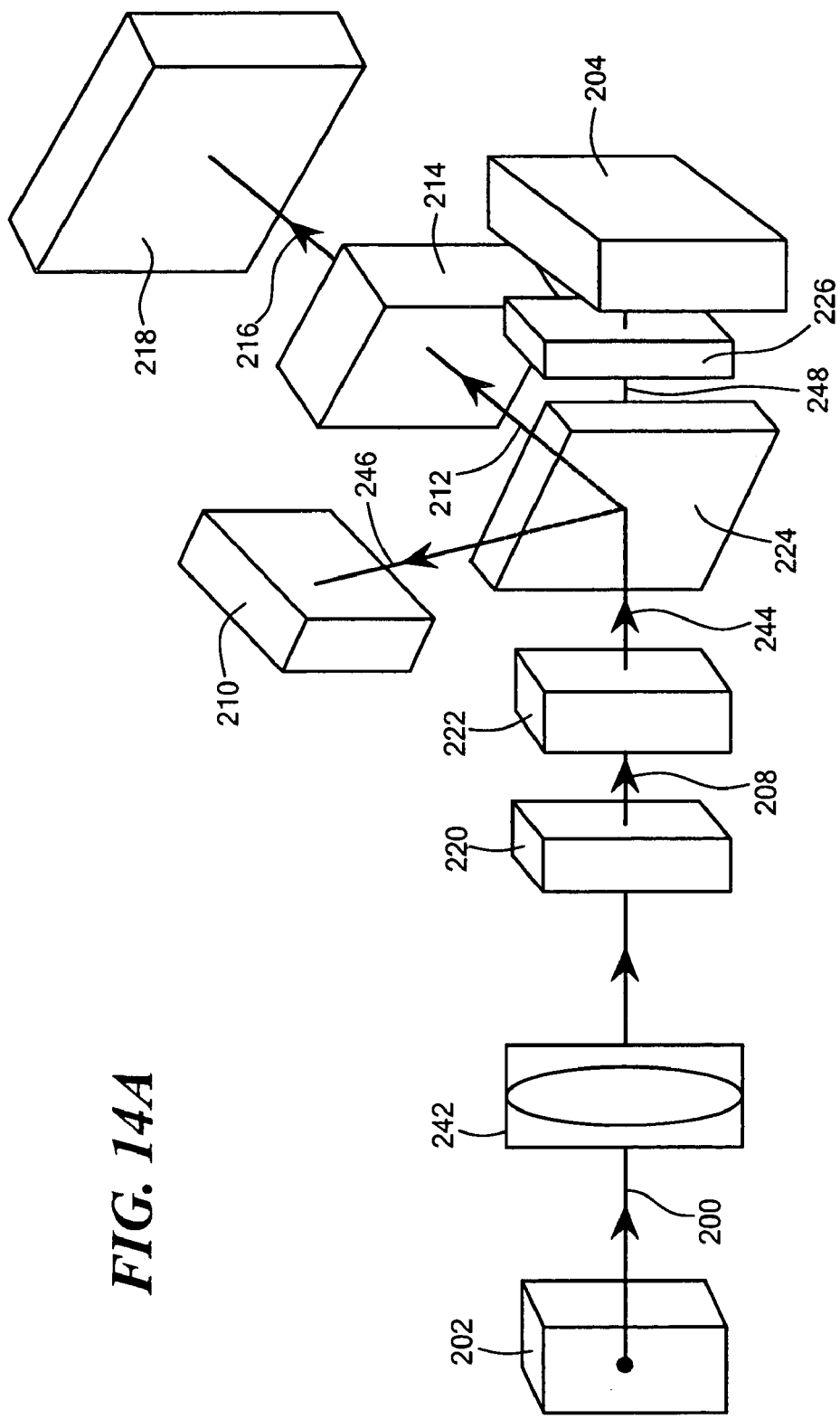
FIG. 14A is a schematic block diagram illustrating the use of an array of mirrors (micro-mirrors) implemented within a sequential color projection display system in accordance with an embodiment of the subject invention.

FIG. 14A is a schematic block diagram illustrating the use of an array of mirrors (micro-mirrors) implemented within a sequential color projection display system in accordance with an embodiment of the subject invention. Incident light beams 200 from light source 202 are collected and concentrated by lens system 242 and then filtered into a time sequence of red, green and blue light using a color separation device 220 such as a color wheel 220 or scrolling color device 220.

Polarization recovery system 222 converts all of the color light 208 to the same polarization state so that essentially all of the converted color light 244 is transmitted through polarization beam splitter 224 and subsequently through polarization rotator 226 to reach the M×N-pixel mirror array 204 (mirrors not shown) driven in sequence with the color wheel 220. The polarization recovery system 222 can alternatively be placed in the system between the light source 202 and the lens system 242 or between the lens system 242 and the color separation device 220.

The mirror array 204 independently actuates each mirror to an "on" or an "off" state, directing and reflecting light in two different directions. In the "off" state, the mirrors 204 reflect and direct the light back through the polarization rotator 226 so that it reflects off the polarization beam splitter 224 to strike optical absorber 210. In the "on" state, the mirrors 204 reflect and direct the light through the polarization rotator 226 so that it reflects off the polarization beam splitter 224 to the next processing stage 214. Red, green and blue light is flashed in sequence to create a full color image. Each mirror within the mirror array can independently transition between an "on" state and an "off" state or vice versa with a frequency synchronous with the operation of the color separation device 220, such as a color wheel 220 or scrolling device 220.

The next processing stage 214 includes any necessary imaging optics required for a projection display system. The projected optical (light) beams 216 that are the output of the next processing stage 214 are imaged and projected onto a receptor 218 to form an image (not shown). The receptor 218 may be embodied as a screen, a machine vision system, an optical processor, optical computer or other appropriate device. The light processed by this system may be of the ultraviolet, visible or infrared type.

In other embodiments, light source 202 is an array of color light sources (e.g., red, green, and blue light-emitting diodes in a single package). In this embodiment, each color light source of the array can be turned in sequence, and as a result, no color wheel or scrolling device 220 is required by the system.

In yet other embodiments, three separate single color light sources (e.g., red, green, and blue light-emitting diodes) are combined with a single dichroic optical beam splitter (sometimes called an x-cube) or alternatively combined with two separate dichroic combiners to form a single optical beam. Again each of these light sources can be turned on and off in sequence so that no color wheel or scrolling color device 220 is required by the system.

Figure 14B:
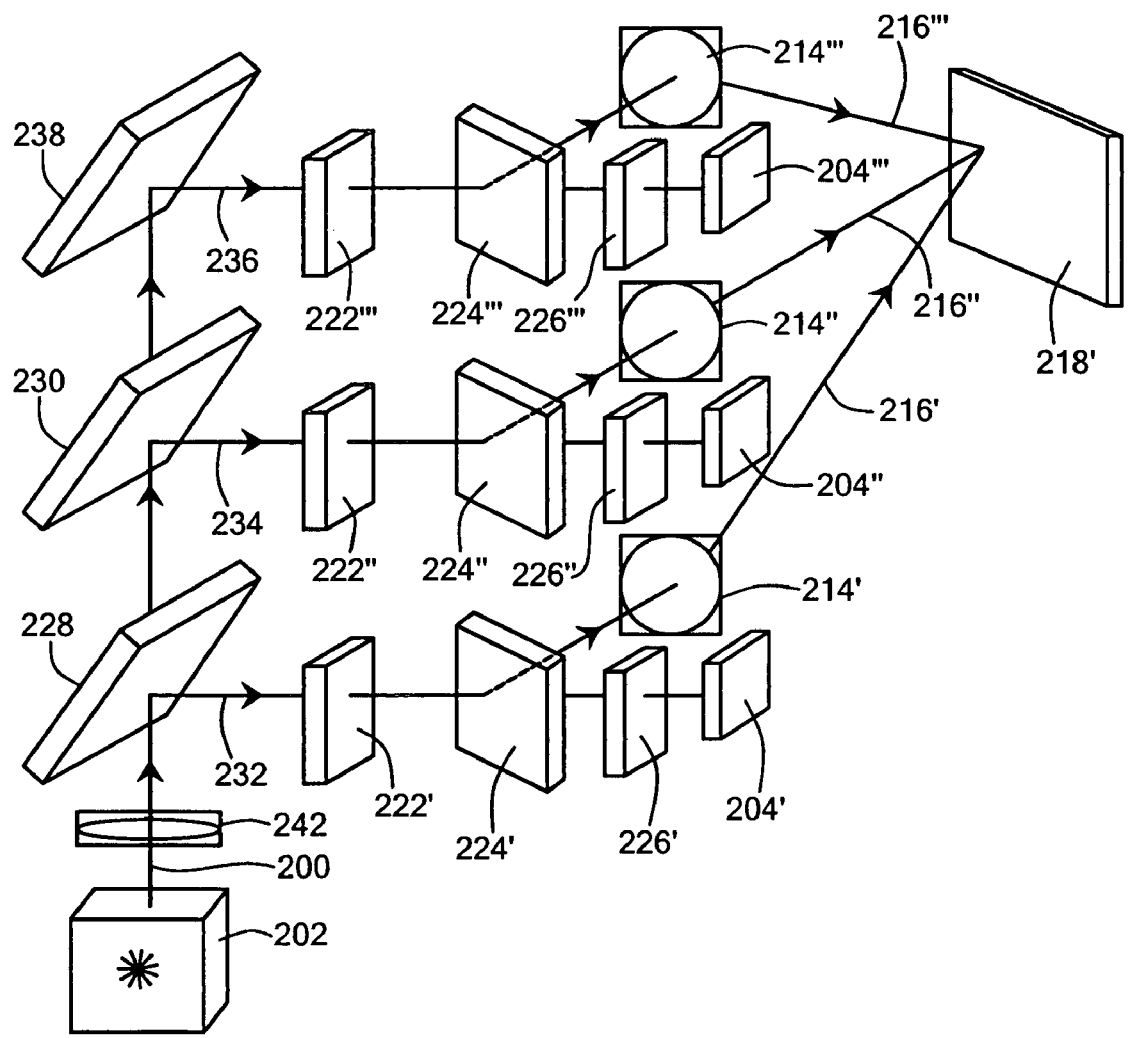
FIG. 14B is a schematic block diagram illustrating the use of 3 arrays of mirrors (micro-mirrors) implemented within a parallel color projection display system in accordance with an embodiment of the subject invention.

FIG. 14B is a schematic block diagram illustrating the use of 3 arrays of mirrors (micro-mirrors) 204', 204", 204''' implemented within a parallel color projection display system in accordance with an embodiment of the subject invention. Incident light beams 200 from light source 202 are collected and concentrated by condenser lens system 242 and filtered by reflection off a set of dichroic filters 228, 230 to extract and separate out two of the three colors as incident beams 232 and 234 respectively. The remaining light 236 consists primarily of the third color, and it is reflected off mirror 238 to form the third incident beam.

The three separated colors of light, incident beams 232, 234 and 236 respectively, are each converted to a single linear polarization state by polarization recycling devices 222', 222" and 222''' respectively. Alternatively, a single polarization-recycling device for all three colors can be placed in the system immediately after the lens system 242.

Each of the three beams 232, 234, 236 is output from the recycling devices 222', 222" and 222''' and passes through the polarization beam splitters 224', 224" and 224''' and through the polarization rotators 226', 226" and 226''' respectively, before reflecting off the circuit-driven mirror arrays 204', 204" and 204''' respectively.

Unlike the sequential color projection display of FIG. 14A, the parallel color projection display of FIG. 14B does not filter and sequence red, green and blue colors of the light over time. Instead, red, green and blue colors are merged simultaneously.

The mirror pixels of mirror array 204', 204" and 204''' that are in the "off" state reflect the light back through polarization rotators 226', 226" and 226''' respectively to three optical absorber blocks (not shown) in a manner similar to that shown in FIG. 14A. The mirrors of the mirror array 204', 204" and 204''' that are in the "on" state direct the light back through polarization rotators 226', 226" and 226''' so that these light beams then reflect off polarization beam splitters 224', 224" and 224''' respectively to be directed incident on the projection lens systems 214', 214" and 214''' respectively. The output light beams 216', 216" and 216''' from the projection lens systems 214', 214", and 214''' are converged and focused onto a single distant receptor 218' to form a magnified color image. Other related embodiments that use these same principles will be apparent to those skilled in the art of projection display design.

Thus, the instant invention is directed to the fields of optical signal processing, laser beam directing (steering), displays, and in any environment where micro-electromechanical mirrors are used in optical communications. Various actuation mechanisms such as electrostatic, electromagnetic, thermal (bimorph and memory alloy) can be used to actuate and deform the membrane into a well formed by a spacer structure, and each of them can be implemented with the subject invention to achieve high angular deflection angles of the rigid optical mirror.

U.S. patent application Ser. No. 10/215,576, incorporated herein by this reference, discloses subject matter related to the subject matter of the invention described herein.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A high angular deflection micro-mirror system comprising:
    a substrate;
    a spacer structure having two spacers extending from the substrate;
    a deformable membrane having a center point and supported only by the two spacers of the spacer structure;
    a support having a first and a second end and where the first end is disposed away from the center point on the deformable membrane; and
    a mirror disposed on the second end of the support.

2. The system of claim 1 in which the support is a post upstanding on the deformable membrane.

3. The system of claim 1 in which the mirror is a rigid mirror.

4. The system of claim 1 in which the substrate includes an electrically conductive layer.

5. The system of claim 4 in which the substrate further includes a layer over the electrically conductive layer.

6. The system of claim 5 in which the said layer is electrically insulating.

7. The system of claim 5 in which the said layer is an anti-stiction layer.

8. The system of claim 4 in which the deformable membrane includes an electrode layer.

9. The system of claim 8 in which the deformable membrane further includes an insulating layer.

10. The system of claim 8 further including a voltage source interconnected with the electrically conductive layer of the substrate and the electrode layer of the deformable membrane.

11. The system of claim 1 in which the spacer structure is made of an insulating material.

12. The system of claim 1 in which the spacer structure includes a plurality of spaced members upstanding on the substrate and supporting the ends of the membrane.

13. The system of claim 1 in which the mirror includes a support layer and, on top thereof, a reflective surface.

14. The system of claim 1 in which the support and the deformable membrane are integral in construction.

15. The system of claim 1 in which the mirror and the support are integral in construction.

16. The system of claim 1 in which the support, the deformable membrane, and the mirror are integral in construction.

17. The system of claim 1 in which the mirror extends away from the center point of the deformable membrane.

18. The system of claim 1 further comprising a second mirror and a second support, the second support having a first and a second end, the first end is disposed away from the center point on the deformable membrane, the second mirror disposed on the second end of the support.

19. The system of claim 18 where the first mirror is configured to reflect and direct a first optical beam and the second mirror is configured to reflect and direct a second optical beam, the first and the second optical beams directed by the first and second mirror to overlap after reflecting off of the first and second mirrors.

20. An array of high angular deflection micro-mirrors comprising:
a substrate;
a plurality of spacer structures extending from the substrate;
a plurality of deformable membranes each having a center point and each supported by at least one associated spacer structure;
a plurality of supports each having a first and second end and each disposed away from the center point and away from the at least one spacer of an associated one of the plurality of deformable membranes; and
a plurality of mirrors, each mirror is disposed on an associated one of the plurality of supports and cantilevered therefrom.

21. The array of high angular deflection micro-mirrors of claim 20 where the substrate is a layer of a very large scale integrated (VLSI) chip of the active matrix addressed type.

22. The array of high angular deflection micro-mirrors of claim 20 where the array is configured to direct light within a sequential color display application.

23. The array of high angular deflection micro-mirrors of claim 20 where the array is configured to direct light within a parallel color display application.

24. A high angular deflection micro-mirror system comprising:
a substrate;
a spacer structure extending from the substrate;
a deformable membrane supported by the spacer structure;
a rigid mirror having a first and a second end, the mirror supported on the first end above the deformable membrane and having a second end which rotates upward when the deformable membrane deflects downwards towards the substrate, the first end of the mirror disposed between the center point on the deformable membrane and the spacer structure.

25. The system of claim 24 in which the first end of the mirror is disposed closer to the spacer structure than the center point on the deformable membrane.

* * * * *